US011030802B2

(12) United States Patent
Miyaoka et al.

(10) Patent No.: US 11,030,802 B2
(45) Date of Patent: Jun. 8, 2021

(54) DYNAMIC MAP UPDATE DEVICE, DYNAMIC MAP UPDATE METHOD, AND NON-TRANSITORY COMPUTER READABLE MEDIUM RECORDING DYNAMIC MAP UPDATE PROGRAM

(71) Applicant: TOYOTA JIDOSHA KABUSHIKI KAISHA, Toyota (JP)

(72) Inventors: Saeko Miyaoka, Tokyo (JP); Koji Taguchi, Sagamihara (JP); Masato Endo, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 421 days.

(21) Appl. No.: 16/020,516

(22) Filed: Jun. 27, 2018

(65) Prior Publication Data

US 2019/0019330 A1   Jan. 17, 2019

(30) Foreign Application Priority Data

Jul. 13, 2017 (JP) .............................. JP2017-136946

(51) Int. Cl.
*G06T 17/05* (2011.01)
*H04N 7/18* (2006.01)
*G01C 21/32* (2006.01)
*G08G 1/13* (2006.01)
*G06K 9/00* (2006.01)

(52) U.S. Cl.
CPC .............. *G06T 17/05* (2013.01); *G01C 21/32* (2013.01); *G08G 1/13* (2013.01); *H04N 7/181* (2013.01); *H04N 7/183* (2013.01); *G06K 9/00791* (2013.01)

(58) Field of Classification Search
CPC ........ G06T 17/05; H04N 7/183; H04N 7/181; G01C 21/32; G08G 1/13; G08G 1/0133; G08G 1/0112; G08G 1/0141; G06K 9/00791
See application file for complete search history.

(56) References Cited

U.S. PATENT DOCUMENTS

| 10,678,262 | B2* | 6/2020 | Browning | ............ G05D 1/0212 |
| 10,794,710 | B1* | 10/2020 | Liu | ............................. G06T 7/73 |
| 10,810,419 | B2* | 10/2020 | Mittal | .................. G09B 29/004 |

(Continued)

FOREIGN PATENT DOCUMENTS

| JP | 2006221537 A | 8/2006 |
| JP | 2010028492 A | 2/2010 |
| JP | 2013108820 A | 6/2013 |

(Continued)

*Primary Examiner* — Richard M Camby
(74) *Attorney, Agent, or Firm* — Hunton Andrews Kurth LLP

(57) ABSTRACT

A dynamic map update device includes a processor configured to: acquire a captured image from a plurality of vehicles, each of the plurality of vehicles having a camera configured to capture surroundings, the captured image being captured by the camera; update a dynamic map of a predetermined area based on the captured image; vary an update frequency of the dynamic map depending on a position among a plurality of positions in the predetermined area; and acquire the captured image from the plurality of vehicles according to the update frequency.

20 Claims, 6 Drawing Sheets

(56) References Cited

U.S. PATENT DOCUMENTS

| | | | | |
|---|---|---|---|---|
| 2003/0125871 A1* | 7/2003 | Cherveny | ............ | G08G 1/0969 |
| | | | | 701/409 |
| 2009/0094649 A1* | 4/2009 | Patel | .................... | H04N 21/442 |
| | | | | 725/86 |

FOREIGN PATENT DOCUMENTS

| | | | |
|---|---|---|---|
| JP | 2015042957 A | 3/2015 | |
| JP | 2016192028 A | 11/2016 | |
| JP | 2016215751 A | 12/2016 | |

* cited by examiner

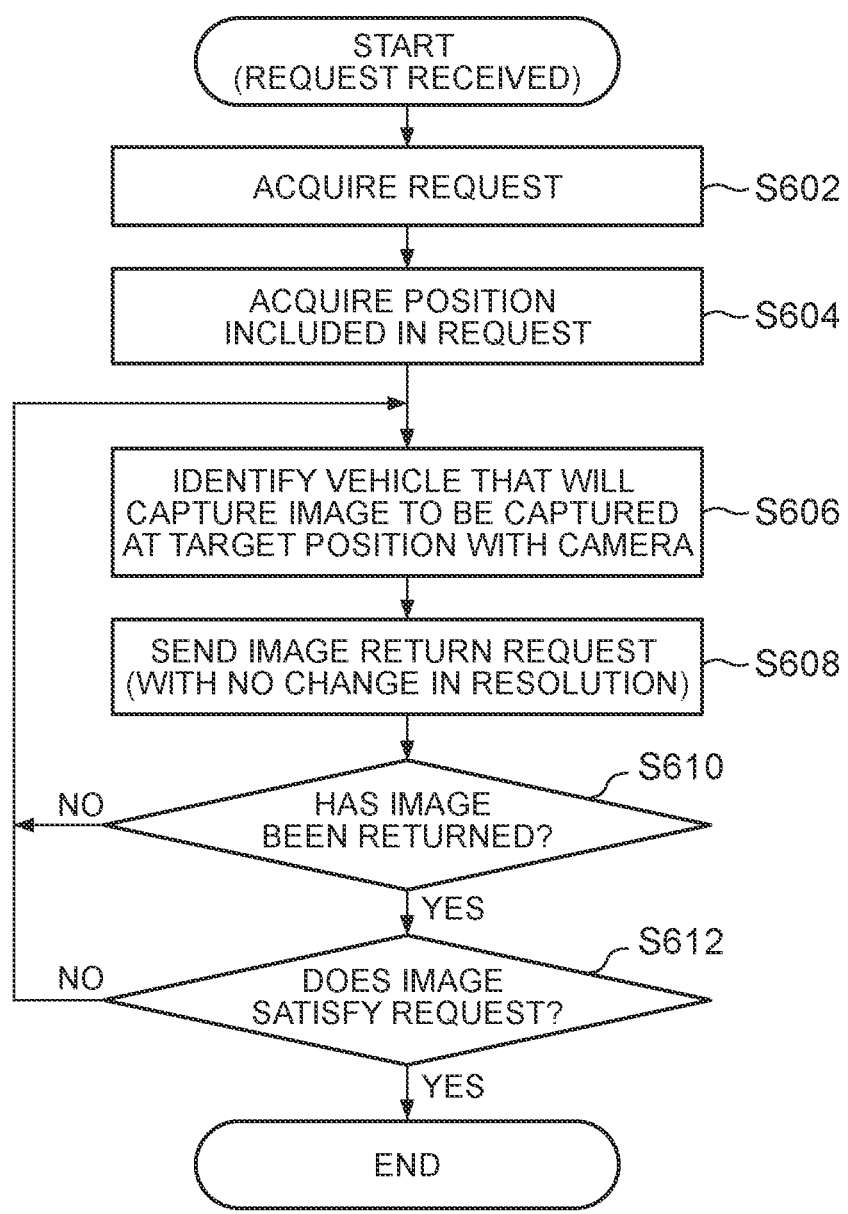

DYNAMIC MAP UPDATE DEVICE, DYNAMIC MAP UPDATE METHOD, AND NON-TRANSITORY COMPUTER READABLE MEDIUM RECORDING DYNAMIC MAP UPDATE PROGRAM

INCORPORATION BY REFERENCE

The disclosure of Japanese Patent Application No. 2017-136946 filed on Jul. 13, 2017 including the specification, drawings and abstract is incorporated herein by reference in its entirety.

BACKGROUND

1. Technical Field

The present disclosure relates to a dynamic map update device, a dynamic map update method, and a non-transitory computer readable medium recording a dynamic map update program.

2. Description of Related Art

A dynamic map that provides digital map information, in which static base map information and dynamic environment information are integrated, is known. The static base map information indicates the road line shapes and so on, and the dynamic environment information indicates the real-time road surface condition, accident occurrence positions, vehicle positions, pedestrian positions and so on (see, for example, Japanese Patent Application Publication No. 2016-192028 (JP 2016-192028 A)).

SUMMARY

However, when the server collects captured images from a plurality of vehicles, each having an image capturing unit that captures the image of the surroundings, for use in updating the dynamic map based on the captured images, the amount of communication for sending captured images from the vehicles to the server becomes a problem. Therefore, in a configuration where a plurality of vehicles send captured images to the server at the same frequency at any position in a target area, the captured images of a place where information updating is not required so frequently are also sent to the server at the same frequency with the result that unnecessary communication costs are generated.

The present disclosure provides a dynamic map update device, a dynamic map update method, and a non-transitory computer readable medium recording a dynamic map update program that can update a dynamic map, based on the captured images collected from a plurality of vehicles while reducing the unnecessary communication costs.

A first aspect of the disclosure provides a dynamic map update device. The dynamic map update device according to the first aspect includes a processor configured to: acquire a captured image from a plurality of vehicles, each of the plurality of vehicles having a camera configured to capture surroundings, the captured image being captured by the camera; update a dynamic map of a predetermined area based on the captured image; vary an update frequency of the dynamic map depending on a position among a plurality of positions in the predetermined area; and acquire the captured image from the plurality of vehicles according to the update frequency.

According to the configuration described above, since the update frequency varies depending on the position in the target area, the dynamic map update device can request the vehicle to send captured images according to the update frequency that is different depending on the position. Therefore, the dynamic map update device causes the vehicle to return (upload) only the required captured images according to the update frequency, allowing the dynamic map to be updated while reducing the unnecessary communication costs.

In the first aspect, the processor may be configured to acquire update need information on an update need of a user, the update need information being related to an arbitrary position of the plurality of positions, the user using the dynamic map, and update the dynamic map in such a way that, based on the update need information, the update frequency of the arbitrary position becomes higher as the update need for updating the arbitrary position is higher in the predetermined area.

According to the configuration described above, the dynamic map update device can acquire the update need information on the user's update need that may differ depending on the position in the target area (predetermined area) of the dynamic map. Therefore, the dynamic map update device can actually update the dynamic map based on the update need information in such a way that the update frequency becomes higher as the update need is higher.

In the first aspect, the processor may be configured to identify an acquisition condition based on the update need information, the acquisition condition including an acquisition position where the captured image is to be acquired by the camera, acquire position information on each of the plurality of vehicles, identify a capturing vehicle that will capture the acquisition position from among the plurality of vehicles, based on the position information, send a return request to the capturing vehicle, the return request requesting a return of the captured image captured by the camera at the acquisition position, and acquire the captured image from the capturing vehicle, the captured image being returned in response to the return request.

According to the configuration described above, the dynamic map update device identifies the vehicle that will capture the image based on the target position where the captured image, identified from the update need information, is to be acquired and on the position information on each of the vehicles 3 and, then, requests the identified vehicle to return the captured image of the target position. That is, the dynamic map update device can actually cause the vehicle to return (upload) the captured image according to the user's update need based on the update need information. Therefore, the dynamic map update device can actually update the dynamic map while reducing the unnecessary communication costs.

In the first aspect, the processor may be configured to acquire the update need information including information on a posting frequency to a social networking service at the arbitrary position.

According to the configuration described above, if the social networking service (SNS) posting frequency at a certain position is relatively high, the dynamic map update device can estimate that the user's interest in an object or an event at that position is high. That is, the dynamic map update device can actually determine the user's update need based on the SNS posting frequency according to the position in the target area.

In the first aspect, the processor may be configured to acquire the update need information including information on the posting frequency within a latest predetermined time, and identify a position where the posting frequency is relatively higher than at other positions in the predetermined area, as the acquisition position.

According to the configuration described above, the dynamic map update device can actually determine a position where the SNS posting frequency within the latest predetermined time is relatively high as a position where the user's update need is relatively high and, thus, identify the position as a position where the captured image is to be captured.

In the first aspect, the processor may be configured to acquire the update need information including a request from the user for updating the dynamic map for the arbitrary position.

According to the configuration described above, when a request is received from the user for updating the dynamic map for a certain position, the dynamic map update device can directly determine that there is a need for updating the dynamic map for that position. Therefore, the dynamic map update device can actually determine the user's update need based on a request for updating the dynamic map for an arbitrary position in the target area.

In the first aspect, the processor may be configured to acquire the update need information including the request for requesting an acquisition of the captured image at the arbitrary position from the user, and identify the arbitrary position as the acquisition position.

According to the configuration described above, the dynamic map update device can actually determine the position, specified by the image acquisition request requesting the acquisition of a captured image, as a position where the user's update need is relatively high and, thus, can identify the position as a position where the captured image is to be acquired.

In the first aspect, the processor may be configured to acquire the update need information including history information on a capturing position where the captured image is acquired in the past.

According to the configuration described above, when a certain position frequently occurs as the capturing position of captured images acquired in the past, the dynamic map update device can estimate that the user's update need for the position tends to be relatively high. That is, the dynamic map update device can actually determine the user's update need based on the history information (image acquisition history information) on the capturing positions of the captured images acquired in the past.

In the first aspect, the history information may include a plurality of capturing positions where the captured image is acquired in the past, and the processor may be configured to identify a frequent capturing position among the capturing positions, as an identified capturing position where the captured image is to be acquired, wherein occurrence frequency of the frequent capturing position, in the history information, may be relatively higher than occurrence frequency of the other capturing positions in the predetermined area.

According to the configuration described above, the dynamic map update device can actually determine a capturing position which is included in the capturing positions of the captured images acquired in the past and whose frequency of occurrence in the history information is relatively high, as a position where the user's update need is relatively high and, thus, can identify the position as a position where the captured image is to be acquired.

In the first aspect, the history information may include a capturing time of the captured image, and the processor may be configured to identify, at the identified capturing position, a frequent time zone among time zones, as a timing at which the captured image satisfying the acquisition condition is to be acquired, the time zones being time zones to which the capturing times of the captured images captured in the past belong, occurrence frequency of the frequent time zone, in the history information, being relatively higher than occurrence frequency of the other time zones of a day, and identify, from among the plurality of vehicles, a second capturing vehicle that will capture the acquisition position.

According to the configuration described above, for the position where the captured image is to be acquired, the dynamic map update device further determines the time zone in which the update need is relatively high based on the history information that includes the capturing times of the captured images. Then, as the timing at which the captured image is to be acquired, the dynamic map update device can identify the determined time zone as the timing at which the captured image is to be acquired. Therefore, the dynamic map update device can cause the vehicle to send the captured image according not only to the user's update need that depends on the position in the target area but also to the user's update need that depends on the time zone. That is, the dynamic map update device can reflect the update need, determined from the user's chronological viewpoint, on the acquisition timing of the captured image, further reducing the unnecessary communication costs.

In the first aspect, the processor may be configured to determine whether an object or an event is known, the object or the event being a capturing target at the acquisition position, and send the return request to the capturing vehicle, the return request requesting the return of the captured image captured by the camera at the acquisition position with a resolution set lower when the capturing target is determined to be know than when the capturing target is determined to be not known.

According to the configuration described above, if the capturing target at the position where the captured image is to be acquired is known, the dynamic map update device can cause the vehicle to send the captured image with a low resolution because there is no problem in determining the situation of the captured image even if its resolution is low. Therefore, the dynamic map update device can reduce the capacity of the captured image to be sent from the vehicle, further reducing the unnecessary communication costs.

In the first aspect, the processor may be configured to determine that the capturing target is known when the capturing target is registered in the dynamic map update device.

A second aspect of the disclosure provides a dynamic map update method. The dynamic map update method according to the second aspect is executed by a device configured to communicate with a plurality of vehicles, each of the plurality of vehicles having a camera configured to capture surroundings, the dynamic map update method comprising: (a) acquiring a captured image from the plurality of vehicles, the captured image being captured by the camera; (b) updating a dynamic map of a predetermined area based on the captured image; (c) varying an update frequency of the dynamic map depending on a position among a plurality of positions in the predetermined area; and (d) acquiring the captured image from the plurality of vehicles according to the update frequency.

A third aspect of the disclosure provides a non-transitory computer readable medium recording a dynamic map update program. The program causes a computer to execute: acquiring a captured image from a plurality of vehicles, each of the plurality of vehicles having a camera configured to capture surroundings, the captured image being captured by the camera; updating a dynamic map of a predetermined area based on the captured image; varying an update frequency of the dynamic map depending on a position among plurality of positions in the predetermined area; and acquiring the captured image from the plurality of vehicles according to the update frequency.

According to the embodiments described above, it is possible to provide a dynamic map update device, a dynamic map update method, and a non-transitory computer readable medium recording a dynamic map update program that can update a dynamic map, based on the captured images collected from a plurality of vehicles while reducing the unnecessary communication costs.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a flowchart schematically showing a second example of captured image acquisition processing by the center server.

DETAILED DESCRIPTION OF EMBODIMENTS

An embodiment of the present disclosure will be described in detail below with reference to the drawings.
[Configuration of Dynamic Map Delivery System]

First, a configuration of a dynamic map delivery system 1 according to this embodiment will be described with reference to FIG. 1 to FIG. 4.

Figure 1:
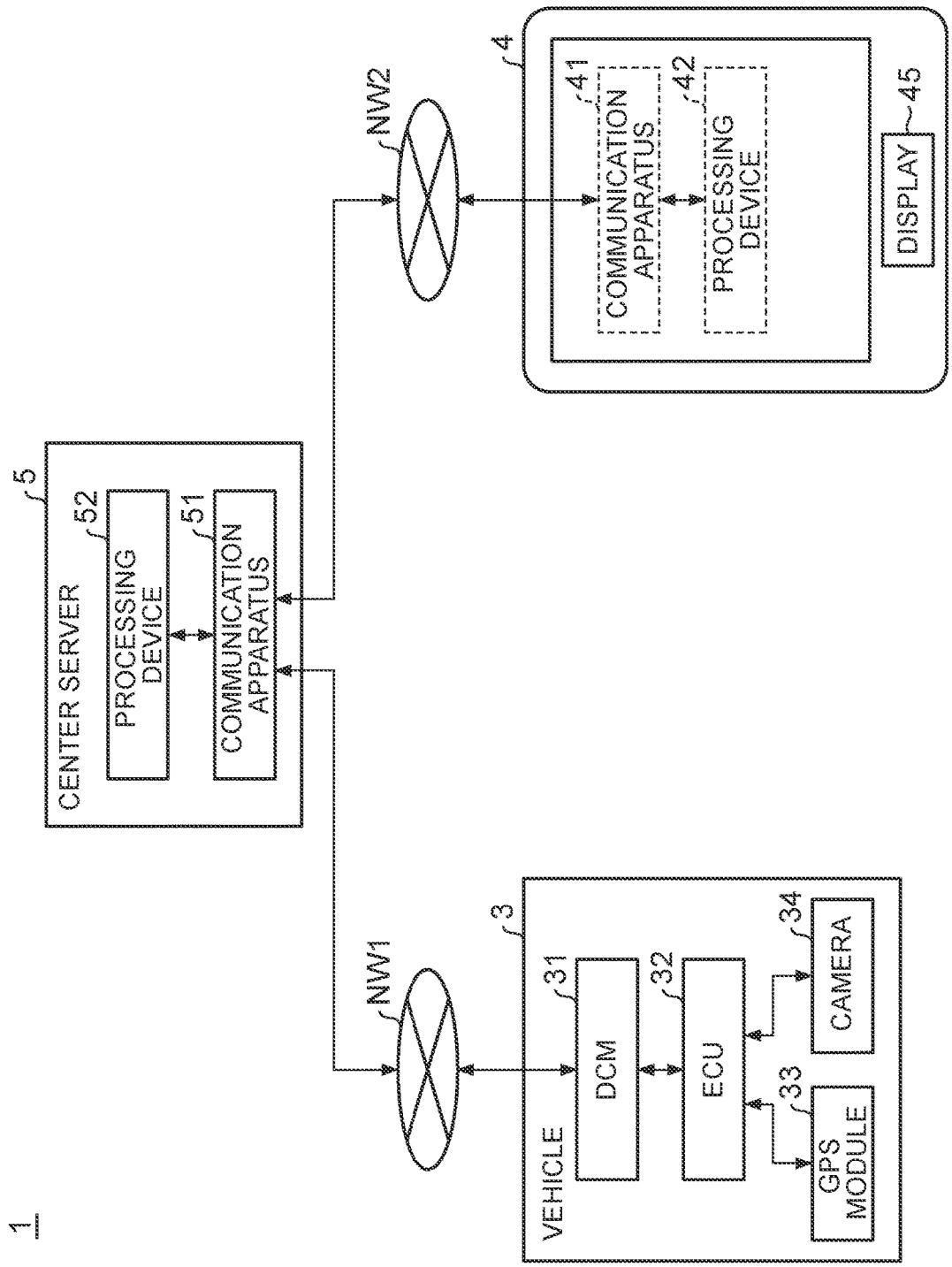
FIG. 1 is a diagram schematically showing an example of a configuration of a dynamic map delivery system.
Figure 2:
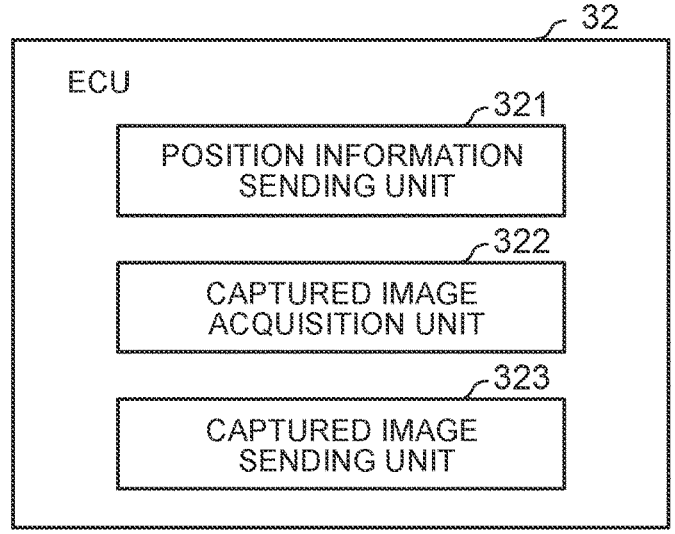
FIG. 2 is a functional block diagram showing an example of a functional configuration of a vehicle.
Figure 3:
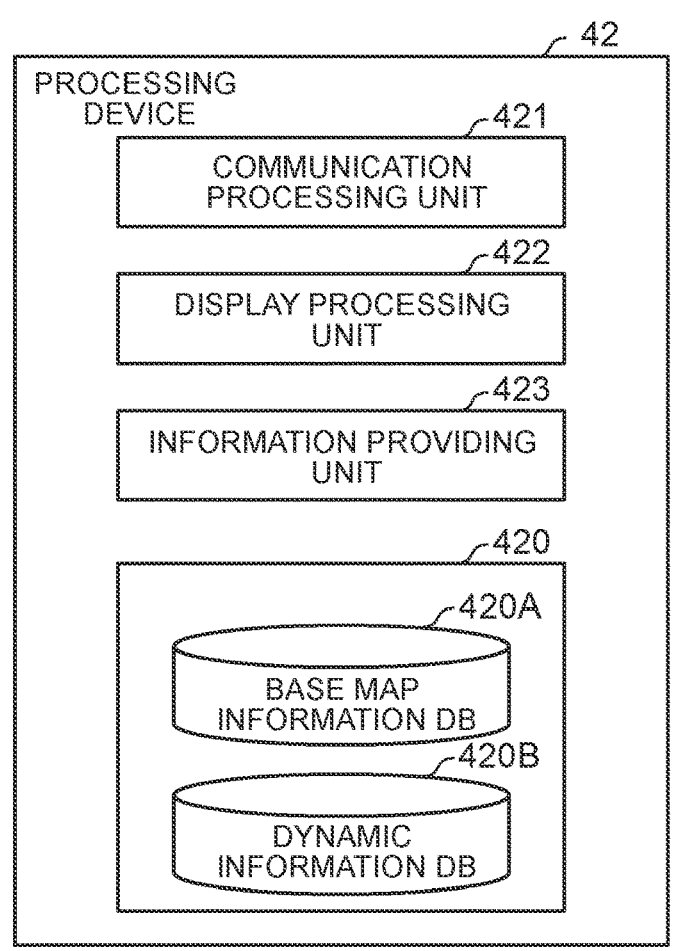
FIG. 3 is a functional block diagram showing an example of a functional configuration of a mobile terminal.
Figure 4:
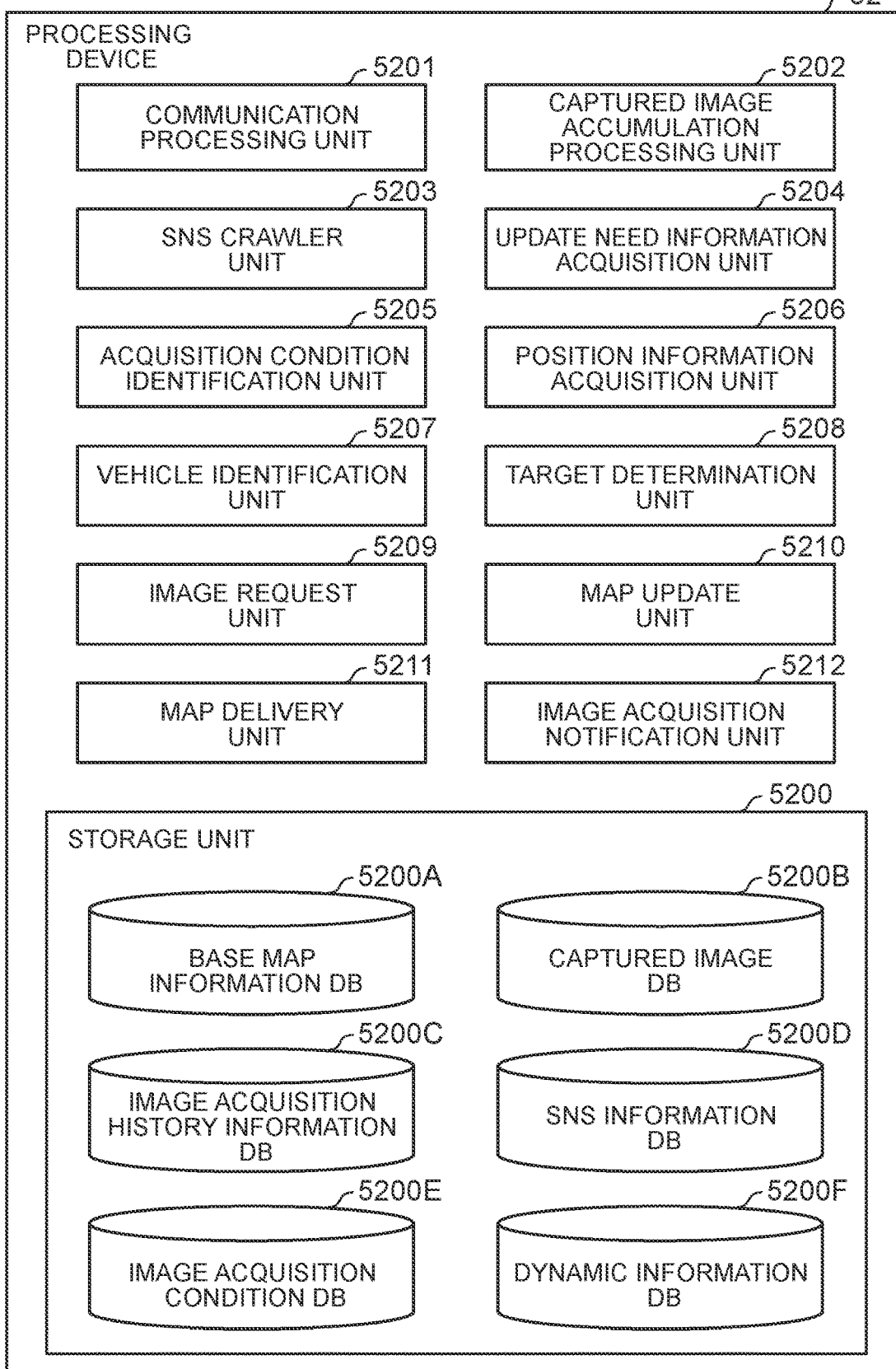
FIG. 4 is a functional block diagram showing an example of a functional configuration of a center server.

FIG. 1 is a diagram schematically showing an example of a configuration of the dynamic map delivery system 1 according to this embodiment. FIG. 2 is a functional block diagram showing an example of a functional configuration of a vehicle 3. FIG. 3 is a functional block diagram showing an example of a functional configuration of a terminal 4. FIG. 4 is a functional block diagram showing an example of a functional configuration of a center server 5.

The dynamic map delivery system 1 includes a plurality of vehicles 3, a plurality of terminals 4, and the center server 5 capable of communicating with each of the vehicles 3 and each of the terminals 4. The dynamic map delivery system 1 generates and updates a dynamic map based on the images (captured images) around the vehicle 3 captured by a camera 34, which will be described later, mounted on the vehicle 3 and, at the same time, delivers the generated and updated dynamic map to the terminal 4.

A dynamic maps is a map in which the static base map information, which includes the geographical information on natural objects (such as mountains, rivers, oceans, etc.) and artificial objects (such as buildings, roads, etc.), is associated with the dynamic additional information (environment information) which includes objects at arbitrary positions (for example, shops, facilities, vehicles, etc.), events (for example, accidents, congestion, queues of people, etc.), and their situations. In this embodiment, a dynamic map is built in such a way that the base map information is associated with the information (hereinafter called the dynamic information) on at least one of an object, an event, or their situation that is identified by a captured image around the vehicle 3 and that corresponds to the capturing time and the capturing position of the captured image. The area covered by a dynamic map may be the entire Japan, or may be a specific area. In the description below, an area covered by a dynamic map is referred to as a target area.

A description will be given in this embodiment with emphasis on the update of a dynamic map, as will be described later. Note that, as in the update, the dynamic information on a dynamic map, on which the dynamic map is updated, may be generated from a captured image around the vehicle 3 or may be generated from other information instead of, or in addition to, the captured image.

The vehicle 3 includes a Data Communication Module (DCM) 31, an Electronic Control Unit (ECU) 32, a Global Positioning System (GPS) module 33, and the camera 34.

The DCM 31 is an example of a communication device that bi-directionally communicates with the center server 5 through a predetermined communication network NW1 including, for example, a cellular phone network with a number of base stations as its terminals or the Internet (the same also applies to the communication network NW2). The DCM 31 is connected to various ECUs, including the ECU 32, in such a way that they can communicate with each other through an in-vehicle network such as Controller Area Network (CAN).

The ECU 32 is an electronic control unit that performs various types of control processing related to the predetermined functions in the vehicle 3. For example, the ECU 32 acquires various types of information (vehicle information) on the various states of the vehicle 3 (vehicle state), on the state of the occupants of the vehicle 3, and on the state around the vehicle 3 and, via the DCM 31, uploads the acquired information to the center server 5 as the probe information. The vehicle information includes the information on the control signals corresponding to the various control states of the vehicle 3 (control signal information) and various types of information acquired by the various sensing devices (for example, camera 34) mounted on the vehicle 3 (sensing information). The function of the ECU 32 may be implemented by arbitrary hardware, software, or a combination of hardware and software. For example, the ECU 32 is composed mainly of a microcomputer including a Central Processing Unit (CPU), a Random Access Memory (RAM), a Read Only Memory (ROM), an auxiliary storage device, and an Input-Output interface (I/O). The ECU 32 includes a position information sending unit 321, a captured image acquisition unit 322, and a captured image sending unit 323 as functional units that are implemented by executing one or more programs, stored in a ROM or an auxiliary storage device, on the CPU.

The functions of the ECU 32 may be shared, in part, by one or more of the other ECUs.

The position information sending unit 321 sends (uploads) the position information on the vehicle 3, received from the GPS module 33, to the center server 5 via the DCM 31 at a predetermined cyclic interval. At this time, the position information sending unit 321 may send the other vehicle information, corresponding to the position information, to the center server 5 together with the position information on the vehicle 3.

When an image return request is received from the center server 5 via the DCM 31, the captured image acquisition unit 322 sends the control command to the camera 34 to cause it to output a captured image around the vehicle 3 to the ECU 32. At this time, the captured image acquisition unit 322 may cause the camera 34 to output an image captured immediately after the control command is received or may cause the camera 34 to output an image captured at a predetermined timing defined by the image return request (for example, one second after the control command is received). In addition, the camera 34 may output one captured image or a plurality of captured images. Then, the captured image acquisition unit 322 acquires the captured image that is input to the ECU 32.

The captured image sending unit 323 sends (uploads) the captured image, acquired by the captured image acquisition unit 322, and the position information on the vehicle 3 at the time the captured image was acquired, which is received from the GPS module, to the center server 5 via the DCM 31.

The GPS module 33 receives GPS signals, sent from three or more satellites (preferably four or more satellites) above the vehicle 3, to measure the position of the vehicle 3 on which the GPS module 33 is mounted. The GPS module 33 is connected to the ECU 32 in such a way that they can communicate with each other through a one-to-one communication line or an in-vehicle network such as the CAN. The position information on the vehicle 3, measured in this way, is input to the ECU 32.

The camera 34 is a known capturing unit for capturing the surroundings of the vehicle 3, for example, a predetermined capturing range in front of the vehicle 3. The camera 34 is attached, for example, to the center upper-end portion on the vehicle interior side of the windshield of the vehicle 3, that is, attached to the center of the front header on the interior side of the vehicle 3. The camera 34 is activated by the ignition-on (IG-ON) of the vehicle 3 and, from the time it is activated to the time of the ignition-off (IG-OFF) of the vehicle 3, captures a predetermined capturing range ahead of the vehicle 3 at a predetermined cyclic interval, for example, every 1/30 second. The camera 34 is connected to the ECU 32 in such a way they can communicate with each other via a one-to-one communication line or an on-vehicle network such as the CAN. The camera 34 outputs the captured image to the ECU 32 in response to the control command received from the ECU 32.

The camera 34 may output the captured image around the vehicle 3 to the ECU 32 even when the control command is not received from the ECU 32 (captured image acquisition unit 322). For example, the camera 34 may output the captured image around the vehicle 3 to the ECU 32, from IG-ON to IG-OFF of the vehicle 3, at a predetermined cyclic interval. In this case, when the image sending command is received from the center server 5 via the DCM 31, the captured image acquisition unit 322 may acquire one or more captured images that are sent from the camera 34 to the ECU 32 immediately after the image sending command is received (or after a predefined period of time has elapsed). In addition, the camera 34 may capture the image around the vehicle 3 only when the control command is received from the ECU 32 and then output the captured image to the ECU 32.

The terminal 4 is a terminal to which the center server 5 delivers the information on a dynamic map. For example, the terminal 4 is a mobile terminal, such as a mobile phone, a smartphone, and a tablet terminal, of a user who will use the dynamic map. The terminal 4 may also be a stationary terminal, such as a desktop computer, of a user who will use the dynamic map. In the description below, it is assumed that the terminal 4 is a mobile terminal. The terminal 4 includes a communication apparatus 41, a processing device 42, and a touch panel display (hereinafter simply referred to as "display") 45.

The communication apparatus 41 is a device that bi-directionally communicates with the center server 5 through a predetermined communication network NW2 under the control of the processing device 42. The communication apparatus 41 is a mobile communication module complying with the communication standards such as Long Term Evolution (LTE), 4th Generation (4 G), or 5th Generation (5G).

The processing device 42 performs various control processing in the terminal 4. The processing device 42 is composed mainly of a computer including a CPU, a RAM, a ROM, an auxiliary storage device, and an I/O. The processing device 42 includes a communication processing unit 421, a display processing unit 422, and an information providing unit 423 as the functional units that are implemented by executing one or more programs, stored in the ROM or the auxiliary storage unit, on the CPU. Furthermore, the processing device 42 includes a storage unit 420 as a storage area defined in the ROM or the auxiliary storage device. The storage unit 420 includes a base map information DB (Database) 420A and a dynamic information DB 420B.

The base map information DB 420A and the dynamic information DB 420B are updated with the base map information and the dynamic information delivered from the center server 5. That is, in the base map information DB 420A and the dynamic information DB 420B, the same information as that in the base map information DB 5200A and the dynamic information DB 5200F of the center server 5, which will be described later, is stored.

The communication processing unit 421 controls the communication apparatus 41 to send and receive various signals to and from the center server 5.

The display processing unit 422 causes the display 45 to display various images. For example, in response to a request from the information providing unit 423, the display processing unit 422 causes the display 45 to display the base map image or the dynamic information, which will be described later, using the base map information DB 420A and the dynamic information DB 420B, as will be described later.

The information providing unit 423 causes the display 45 to display the information on the dynamic map, delivered from the center server 5, via the display processing unit 422 in response to a predetermined user's operation. For example, a predetermined application program (hereinafter referred to as "information providing application"), installed in the terminal 4 (processing device 42), is activated in response to a predetermined user's operation and, then, the information providing unit 423 can use the function of the activated program.

For example, the information providing unit 423 causes the display 45 to display the map image (base map image) corresponding to the base map information in a predetermined area that includes the current position of the terminal 4 and, at the same time, to superimpose the dynamic information, related to an arbitrary position in the base map image, on the base map image. At this time, the information providing unit 423 may cause the display 45 to superimpose the dynamic information on the base map image without waiting for a user's operation, or to superimpose the dynamic information, related to the position, in response to a predetermined user's operation, for example, in response to a touch operation on a position on the display 45.

The dynamic information may be displayed in any form. For example, the dynamic information may be displayed as character information or may be displayed as an abstract form like an icon. In addition, the image captured by the camera of the vehicle 3 may be directly displayed.

Furthermore, in response to a user's predetermined operation, the information providing unit 423 sends a dynamic map update request, which is a request concerning the update of the dynamic map for an arbitrary position within the target area of the dynamic map, to the center server 5 via the communication processing unit 421. More specifically, in response to a user's operation of specifying a certain position within the target area, the information providing unit 423 sends an image acquisition request, which requests for acquiring the captured image of the position, to the center server 5 via the communication processing unit 421. At this time, in response to a user's operation of specifying a certain time zone, the information providing unit 423 may send an image acquisition request, in which the position and the time zone for acquiring the captured image are specified, to the center server 5 via the communication processing unit 421.

The center server 5 (an example of the dynamic map update device) acquires captured images, captured by the camera 34, from a plurality of vehicles 3 and, based on the acquired captured images, updates the dynamic map. In addition, the center server 5 delivers the dynamic map to each of the terminals 4. The center server 5 includes a communication apparatus 51 and a processing device 52.

The function of the center server 5 may be implemented by a plurality of servers.

The communication apparatus 51 bi-directionally communicates with each of the vehicles 3 and each of the terminals 4 through the predetermined communication networks NW1 and NW2 under the control of the processing device 52.

The processing device 52 performs various types of control processing in the center server 5. The processing device 52 is composed mainly of one or more server computers each of which includes a CPU, a RAM, a ROM, an auxiliary storage device, and an I/O. The processing device 52 includes the following functional units that are implemented by executing one or more programs, stored in the ROM or the auxiliary storage device, on the CPU: a communication processing unit 5201, a captured image accumulation processing unit 5202, an SNS crawler unit 5203, an update need information acquisition unit 5204, an acquisition condition identification unit 5205, a position information acquisition unit 5206, a vehicle identification unit 5207, a target determination unit 5208, an image request unit 5209, a map update unit 5210, a map delivery unit 5211, and an image acquisition notification unit 5212. Furthermore, the processing device 52 includes a storage unit 5200 as a storage area defined in the auxiliary storage device of the server computer or in the external storage device connected to the server computer. The storage unit 5200 stores a base map information DB 5200A, a captured image DB 5200B, an image acquisition history information DB 5200C, an SNS information DB 5200D, an image acquisition condition DB 5200E, and a dynamic information DB 5200F.

The communication processing unit 5201 controls the communication apparatus 51 to send and receive various signals (control signals, information signals, etc.) to and from the plurality of vehicles 3 and the plurality of terminals 4.

The captured image accumulation processing unit 5202 acquires a captured image, received from the vehicle 3, via the communication processing unit 5201. More specifically, the captured image accumulation processing unit 5202 acquires a captured image that is returned from the vehicle 3 in response to an image return request, which will be described later, and is received by the communication processing unit 5201. After that, the captured image accumulation processing unit 5202 saves the acquired captured image in the captured image DB 5200B in such a way that it is accumulated therein. In addition, the captured image accumulation processing unit 5202 saves the information on the image acquisition history (image acquisition history information), which includes the capturing position and the capturing time of the acquired captured image, in such a way that the image acquisition history information is accumulated in the image acquisition history information DB 5200C.

The SNS crawler unit 5203 periodically (for example, every several minutes to every several tens of minutes) collects (downloads) the SNS posted information posted to a predetermined SNS after the previous processing, as well as the position information (posting position information) and the time information (posting time information) on the position and the time at which the information was posted, based on a known algorithm. The SNS crawler unit 5203 saves the collected SNS posted information in the SNS information DB 5200D with the collected SNS posted information associated with the corresponding posting position information and the posting time information.

The update need information acquisition unit 5204 acquires the information (update need information) on the update need of the users who use the dynamic map for an arbitrary position in the target area of the dynamic map.

For example, as the update need information, the update need information acquisition unit 5204 acquires the information on the frequency of posting to the SNS at an arbitrary position in the target area. More specifically, from the SNS posted information that was posted within the latest predetermined time and is now saved in the SNS information DB 5200D, the update need information acquisition unit 5204 extracts the information on the posting frequency at an arbitrary position (more specifically, position range) in the target area. The update need information acquisition unit 5204 acquires this information because, at a position where the frequency at which information is posted to the SNS is relatively high, it is considered that there are objects, events, or their situations that the users have an interest or a concern and, therefore, it is determined that there is a user's need to update the dynamic map for the position.

In addition, as the update need information, the update need information acquisition unit 5204 acquires a request that is received from the terminal 4 via the communication processing unit 5201 and that is related to the update of the dynamic map for an arbitrary position (position range) in the target area. More specifically, the update need information acquisition unit 5204 acquires an image acquisition request that is received from the terminal 4 via the communication processing unit 5201 and that specifies a certain position (position range) within the target region. The 5204 acquires this request because the position specified by the request received from the user for updating the dynamic map can be directly used to determine that there is a need to update the dynamic map for that position.

In addition, as the update need information, the update need information acquisition unit 5204 acquires, from the image acquisition history information DB 5200C, the image acquisition history information that includes the capturing position and the capturing time of a captured image acquired in the past by the captured image accumulation processing unit 5202. The update need information acquisition unit 5204 acquires this information because the user's update need that depends on a position (position range) in the target area can be estimated based on the occurrence frequency of the capturing position of a captured image that is included in the image acquisition history information acquired in the past.

The "position range" mentioned above may be, for example, a block-number level range in the address, a town-name level range in the address, a wider range, or a narrower range.

The acquisition condition identification unit 5205 identifies the acquisition condition including a position where the image is to be acquired by the camera 34, based on the update need information acquired by the update need information acquisition unit 5204. The acquisition condition may include a timing at which the captured image is to be acquired.

The position information acquisition unit 5206 acquires the latest position information (the current position information) on each of the vehicles 3 received by the communication processing unit 5201.

The vehicle identification unit 5207 identifies, from the plurality of vehicles 3, the vehicle 3 that will capture the position (position range) that satisfies the acquisition condition at the timing that satisfies the acquisition condition, based on the position information on each of the vehicles 3 acquired by the position information acquisition unit 5206.

The target determination unit 5208 determines whether an object or an event that is the capturing target of a capturing image acquired at the position (position range) satisfying the acquisition condition is a known object or a known event (in the description below, such an object is referred to as a capturing target object and such an event is referred to as a capturing target event). For example, the target determination unit 5208 determines whether the capturing target object or the capturing target event is already registered in the dynamic information DB 5200F as the dynamic information for the position (position range) satisfying the acquisition condition.

The image request unit 5209 sends a return request (image return request) to the vehicle 3, identified by the vehicle identification unit 5207, via the communication processing unit 5201. This return request requests the vehicle 3 to return a captured image captured by the camera 34 at the position satisfying the acquisition condition identified by the acquisition condition identification unit 5205.

Furthermore, the image request unit 5209 may change the contents of an image sending request to be sent to the vehicle 3 identified by the vehicle identification unit 5207, based on the determination result of the target determination unit 5208. For example, if it is determined by the target determination unit 5208 that the capturing target object or the capturing target event at the position satisfying the acquisition condition is not known, the image request unit 5209 sends, via the communication processing unit 5201, an image return request that includes the instruction information requesting to return the captured image with no change in the image captured by the camera 34. On the other hand, if it is determined by the target determination unit 5208 that the capturing target object or the capturing target event at the position satisfying the acquisition condition is known, the image request unit 5209 sends, via the communication processing unit 5201, an image return request that includes the instruction information requesting to return the captured image with the resolution of the image, captured by the camera 34, reduced to a lower resolution. The detail will be described later.

The map update unit 5210 updates the dynamic map based on the captured image acquired by the captured image accumulation processing unit 5202. More specifically, the map update unit 5210, updates the dynamic map by updating at least one of the base map information and the dynamic information, which constitutes the dynamic map, based on the captured image acquired by the captured image accumulation processing unit 5202. As described above, in response to the image return request sent from the image request unit 5209 to the vehicle 3 identified by the vehicle identification unit 5207, the captured image accumulation processing unit 5202 acquires the captured image returned from the vehicle 3. That is, the captured image accumulation processing unit 5202 acquires the captured image around the vehicle 3 that was captured at the position identified by the acquisition condition identification unit 5205, taking into consideration the user's update needs based on the update need information. Therefore, the map update unit 5210 can vary the update frequency of the dynamic map depending on the position in the target area of the dynamic map according to the user's update need based on the update need information, that is, the map update unit 5210 can update the dynamic map in such a way that the higher the update need is, the higher the update frequency becomes.

For example, the map update unit 5210 may perform the image recognition processing for the captured image to acquire the three-dimensional geospatial information on the objects (objects such as buildings, features, etc.) obtained by looking in the capturing direction from the capturing position. After that, the map update unit 5210 updates the base map information based on the newly acquired three-dimensional geospatial information. In addition, the map update unit 5210 may compare the newly acquired three-dimensional geospatial information with the three-dimensional geospatial information on the corresponding position already stored in the base map information DB 5200A and, after determining whether there is a need to update the information, update the base map information DB 5200A.

The map update unit 5210 may update the base map information using the captured image captured by the camera 34 and acquired from the vehicle 3, according to a condition different from the acquisition condition identified by the acquisition condition identification unit 5205 based on the update need information. For example, the map update unit 5210 updates the base map information at a predefined cyclic interval (for example, one month to several months), based on the captured image received from the vehicle 3 via the communication processing unit 5201. That is, the base map information may be periodically updated with a frequency lower than the update frequency of the dynamic information.

In addition, the map update unit 5210 identifies (extracts) an object, an event, and the situation at the capturing position of a captured image by performing the image recognition processing for the captured image. More specifically, the map update unit 5210 can carry out the image recognition processing using artificial intelligence (AI), in particular, using a known technology for machine learning such as depth learning to identify an object, an event, and their situation at the capturing position and the capturing time of a captured image. Then, the map update unit 5210 updates the dynamic information, stored in the dynamic information DB 5200F and associated with the position range corresponding to the capturing position, with the information on an object, an event, and a situation at the capturing position and the capturing time of the captured image that is identified by the latest processing. In addition, the map update unit 5210 may compare the newly identified dynamic information with the dynamic information already stored in the dynamic information DB 5200F and related to the corresponding position range. Then, after determining whether there is a need to update the dynamic information, the map update unit 5210 may update the dynamic information DB 5200F.

Although the dynamic information is information related to an object, an event, and their situation identified based on a captured image in this embodiment, the dynamic information may also be the captured image itself. That is, the dynamic map may be built with the base map information and the captured images each associated with an arbitrary position in the base map.

The map delivery unit 5211 delivers a dynamic map, that is, the base map information and the dynamic information constituting the dynamic map, to the terminal 4 via the communication processing unit 5201.

For example, in response to a delivery request received from the terminal 4 via the communication processing unit 5201, the map delivery unit 5211 delivers the base map information and the dynamic information to the terminal 4. At this time, the map delivery unit 5211 delivers to the target terminal 4 only the information (difference information) on a part differing from the contents that ware delivered last to the terminal 4.

Furthermore, when the dynamic map is updated, that is, when at least one of the base map information and the dynamic information, is updated, by the map update unit 5210, the map delivery unit 5211 push-delivers to a push-delivery terminal 4 at least one of the base map information and the dynamic information that has been updated.

When an image acquisition request is received from the terminal 4 via the communication processing unit 5201 and, in response to the request, the corresponding captured image is acquired by the captured image accumulation processing unit 5202, the image acquisition notification unit 5212 sends a notification to the terminal 4, via the communication processing unit 5201, to indicate that the captured image has been acquired. This notification allows the user of the terminal 4, who is the sender of the image acquisition request, to confirm the information on the captured image corresponding to the image acquisition request or on the information on an object, an event, or their situation identified from the captured images, by means of the latest dynamic map delivered to the terminal 4 by the map delivery unit 5211. In addition, the image acquisition notification unit 5212 may send the acquired captured image to the terminal 4 together with the notification.

[Detail of Captured Image Acquisition Operation by the Center Server]

Next, with reference to FIG. 5 to FIG. 7B, the captured image acquisition operation performed by the center server 5 in this embodiment will be described in detail.

Figure 5:
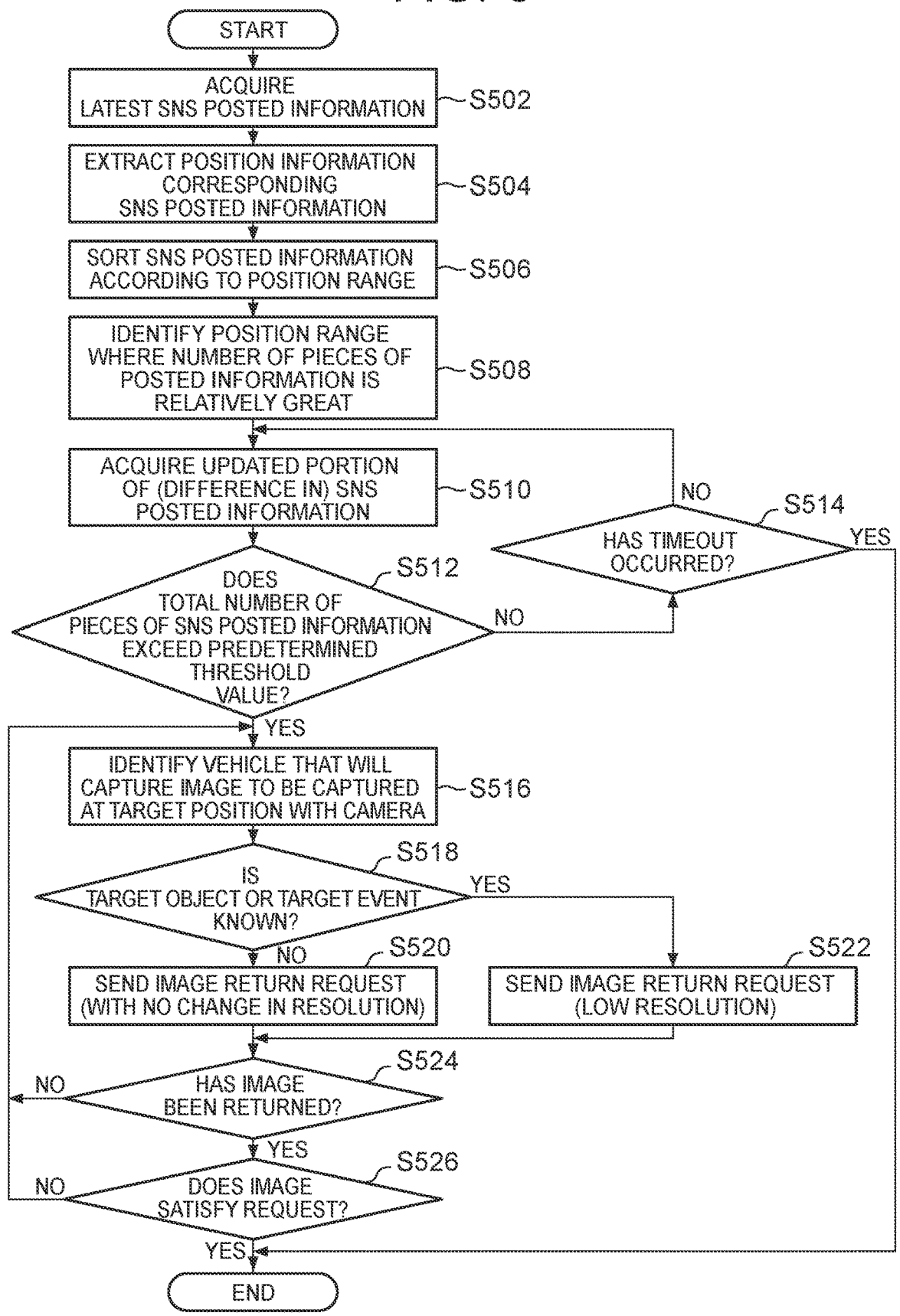
FIG. 5 is a flowchart schematically showing a first example of captured image acquisition processing by the center server.

First, FIG. 5 is a flowchart schematically showing a first example of the captured image acquisition processing performed by the center server 5 (processing device 52) according to this embodiment. The processing according to this flowchart may be repeatedly performed at a predetermined periodic interval (for example, at an interval of several tens of minutes to several hours).

In step S502, the update need information acquisition unit 5204 acquires the latest SNS posted information (more specifically, the SNS posted information posted within the latest predetermined time) from the SNS information DB 5200D.

In step S504, the update need information acquisition unit 5204 extracts the position information corresponding to each piece of the acquired SNS posted information. For example, as the position information corresponding to the SNS posted information, the update need information acquisition unit 5204 extracts the posting position information that is associated with each piece of SNS posted information in the SNS information DB 5200D. Furthermore, the update need information acquisition unit 5204 may analyze whether the contents of the SNS posted information is the posting about an arbitrary position within the target area of the dynamic map. More specifically, as in the above-described image recognition processing, the update need information acquisition unit 5204 may perform the text recognition processing by using a known technology for machine learning such as depth learning to determine whether the description of a position is included. If it is determined that the contents are related to a certain position within the target area of the dynamic map, the update need information acquisition unit 5204 may extract the information on the position, included in the SNS posted information, as the position information corresponding to the SNS posted information.

In step S506, the update need information acquisition unit 5204 sorts the SNS posted information according to the position (position range) in the target area based on the extracted position information. That is, as the update need information, the update need information acquisition unit 5204 acquires the information on the frequency of posting to the SNS (number of times the information was posted to the SNS within a predetermined time) at an arbitrary position within the target area of the dynamic map.

In step S508, the acquisition condition identification unit 5205 identifies a position (position range) where the number of pieces of posted information is relatively greater than that of other positions (position ranges) in the target region, more specifically, where the number of pieces of posed information is equal to or greater than a predefined reference value.

In the description below, the processing in steps S510 to S526 is executed for each identified position (position range), and the position (position range) of the object is referred to as a target position.

In step S510, from the SNS information DB 5200D, the acquisition condition identification unit 5205 acquires the updated portion of the SNS posted information, that is, the updated portion from the processing in step S502 or from the processing of this step performed last.

In step S512, the acquisition condition identification unit 5205 determines whether the total number of pieces of SNS posted information corresponding to the target position exceeds a predetermined threshold value that is set as a value greater than the reference value described above. The total number of pieces of posted information in this step is the number of pieces of posted information obtained by adding the number of pieces of posted information based on the SNS posted information for the update, acquired in step S510, to the number of pieces of posted information identified in the processing in steps S502 to S508. If the total number of pieces of SNS posted information corresponding to the target position does not exceed the predetermined threshold value, the processing of the acquisition condition identification unit 5205 proceeds to step S514. On the other hand, if the total number of pieces of SNS posted information corresponding to the target position exceeds the predetermined threshold value, the acquisition condition identification unit 5205 identifies the target position as a position where the captured image is to be acquired by the camera 34. Then, the processing process proceeds to step S516.

In this example, it is assumed that the image is to be acquired immediately after the vehicle 3 (DCM 31), which will be described later, receives an image return request. However, the timing at which the captured image is to be acquired is not limited to the time immediately after an image return request is received. For example, the timing may be set at a time several seconds to several tens of seconds after receiving the image return request, considering the time until the vehicle 3 arrives at the target position where the captured image is to be acquired.

In step S514, the processing device 52 determines whether a predetermined time has elapsed from the start of this flowchart, that is, whether a timeout has occurred. If the timeout has not occurred, the processing of the processing device 52 returns to step S510 to repeat the processing in steps S510 and S512. If the timeout has occurred, the current processing is terminated.

The predetermined time for determining whether a timeout has occurred is set shorter than the time of the predetermined cycle that is the execution cycle of this flowchart.

In step S516, the vehicle identification unit 5207 identifies the vehicle 3 that will capture the image to be captured at the target position using the camera 34, based on the latest position information on each of the vehicles 3 acquired by the position information acquisition unit 5206.

In step S518, the target determination unit 5208 determines whether the target object or the target event to be captured at the target position is known. If the target object or the target event to be captured at the target position is not known, the processing of the target determination unit 5208 proceeds to step S520. If the target object or the target event to be captured at the target position is known, the processing proceeds to step S522.

In step S520, the image request unit 5209 sends an image return request to the vehicle 3, identified in step S516, via the communication processing unit 5201. The image return request, which is sent in this step, includes the instruction information requesting to return the captured image, captured by the camera 34, with no change in the image.

In step S522, the image request unit 5209 sends an image return request to the vehicle 3 identified in step S516, via the communication processing unit 5201. The image return request, which is sent in this step, includes the instruction information requesting to send the captured image, captured by the camera 34, with the resolution reduced to a lower resolution. This is because, when the capturing target object or the capturing target event is known, it is sufficient to acquire the captured image having a resolution to the extent that the situation can be confirmed. For this reason, the ECU 32 (captured image sending unit 323) of the vehicle 3 sends the captured image with a reduced resolution to the center server 5 via the DCM 31. Sending the captured image with a reduced resolution in this way reduces the data amount of the captured image sent from the vehicle 3 to the center server 5, thus reducing the communication costs for sending the captured image from the vehicle 3 to the center server 5.

In step S524, the captured image accumulation processing unit 5202 determines whether the captured image has been received from the vehicle 3, identified in step S516 by the communication processing unit 5201, within a predetermined period of time from the time the image return request was sent. This predetermined time is set, for example, as a time sufficiently longer than the maximum time required for the processing in the ECU 32 of the vehicle 3 and for the delay time from the time when the captured image is sent from the vehicle 3 to the time when the captured image is received by the center server 5. If the captured image is received within the predetermined period of time from the time when the image return request was sent, the processing of the captured image accumulation processing unit 5202 proceeds to step S526. If the captured image is not received within the predetermined period of time, the processing returns to step S516 to repeat the processing in steps S516 to S522.

In step S526, the captured image accumulation processing unit 5202 determines whether the captured image is an image that satisfies the request. For example, the captured image accumulation processing unit 5202 may determine whether the position information corresponding to the capturing position, received together with the captured image via the communication processing unit 5201, is included in the target position (position range). Furthermore, the captured image accumulation processing unit 5202 may perform the image recognition processing for the captured image to actually determine whether the capturing target object or the capturing target event captured at the target position is included in the captured image. If the captured image is an image that satisfies the request, the captured image accumulation processing unit 5202 acquires the captured image as an image to be used for updating the dynamic map and, then, terminates the current processing. If the captured image is not an image that satisfies the request, the processing returns to step S516 to repeat the processing in steps S516 to S522.

This flowchart may be forced to be terminated if the captured image cannot be acquired from the vehicle 3 even after a predetermined limit time (a time that is set shorter than the time of the execution cycle of this flowchart) has elapsed from the start of this flowchart, or if an image that satisfies the request cannot be acquired. The same applies also to FIG. 7A and FIG. 7B.

Next, FIG. 6 is a flowchart schematically showing a second example of the captured image acquisition processing performed by the center server 5 (processing device 52) according to this embodiment. The processing according to this flowchart is performed when an image acquisition request is received by the communication processing unit 5201.

In step S602, the update need information acquisition unit 5204 acquires the received image acquisition request from the buffer in the RAM.

In step S604, the update need information acquisition unit 5204 acquires the position (target position) specified by the image acquisition request.

In step S606, the vehicle identification unit 5207 identifies the vehicle 3 that will capture the image to be captured at the target position with the camera 34, based on the latest position information on each of the vehicles 3 acquired by the position information acquisition unit 5206.

When the timing at which to acquire the captured image is specified by the image acquisition request, the vehicle identification unit 5207 may wait until immediately before the specified timing and, then, identify the vehicle 3.

In step S608, the image request unit 5209 sends, via the communication processing unit 5201, an image return request that includes the instruction information requesting to return the image, captured by the camera 34, to the vehicle 3, identified in step S606, with no change in the image.

An image acquisition request is issued from the user to acquire the captured image and, therefore, there is a possibility that the imaging target is visually recognized by the user. The determination processing by the target determination unit 5208, though not used in this example, may also be used. The determination processing by the target determination unit 5208, if performed, allows the vehicle 3 to send the captured image with a reduced resolution as in the case shown in FIG. 5, thus reducing the communication costs.

In step S610, the captured image accumulation processing unit 5202 determines whether the captured image has been received from the vehicle 3, identified in step S606 by the vehicle identification unit 5207, within a predetermined period of time from the time the image return request was sent. The detail is the same as that in step S524 in FIG. 5. If the captured image is received within the predetermined period of time from the time the image return request was sent, the processing of the captured image accumulation processing unit 5202 proceeds to step S612. If the captured image is not received within the predetermined period of time, the processing returns to step S606 to repeat the processing in steps S606 and S608.

In step S612, the captured image accumulation processing unit 5202 determines whether the captured image is an image that satisfies the request. The detail is the same as that in step S526 in FIG. 5. If the captured image is an image that satisfies the request, the captured image accumulation processing unit 5202 acquires the captured image as an image to be used for updating the dynamic map and, then, terminates the current processing. If the captured image is not an image that satisfies the request, the processing returns to step S606 to repeat the processing in steps S606 to S612.

This flowchart may be forced to be terminated if the captured image cannot be acquired from the vehicle 3, or if an image that satisfies the request cannot be acquired, even after a predetermined limit time has elapsed from the start of this flowchart. In this case, the image acquisition notification unit 5212 may send a notification, which notifies that the captured image corresponding to the image acquisition request could not be acquired, to the terminal 4, which is the sending source of the image acquisition request, via the communication processing unit 5201.

Figure 7A:
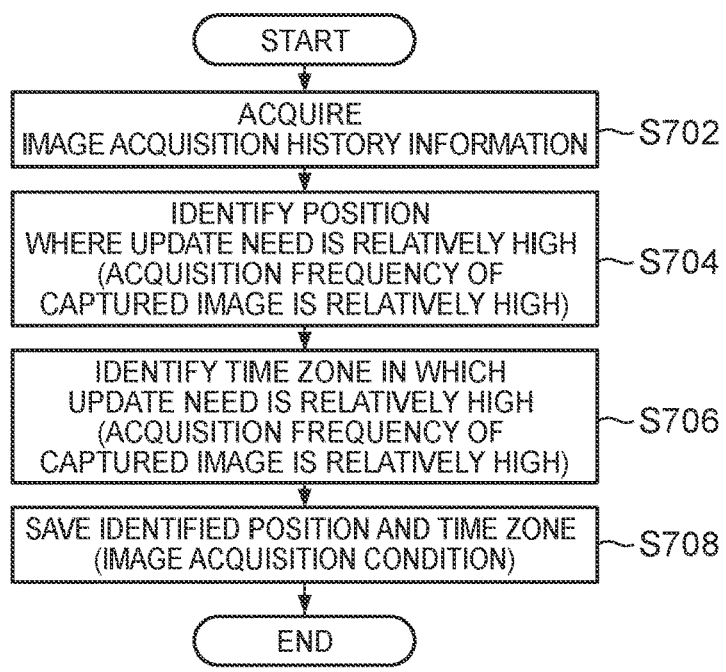
FIG. 7A is a flowchart schematically showing a third example of captured image acquisition processing by the center server.
Figure 7B:
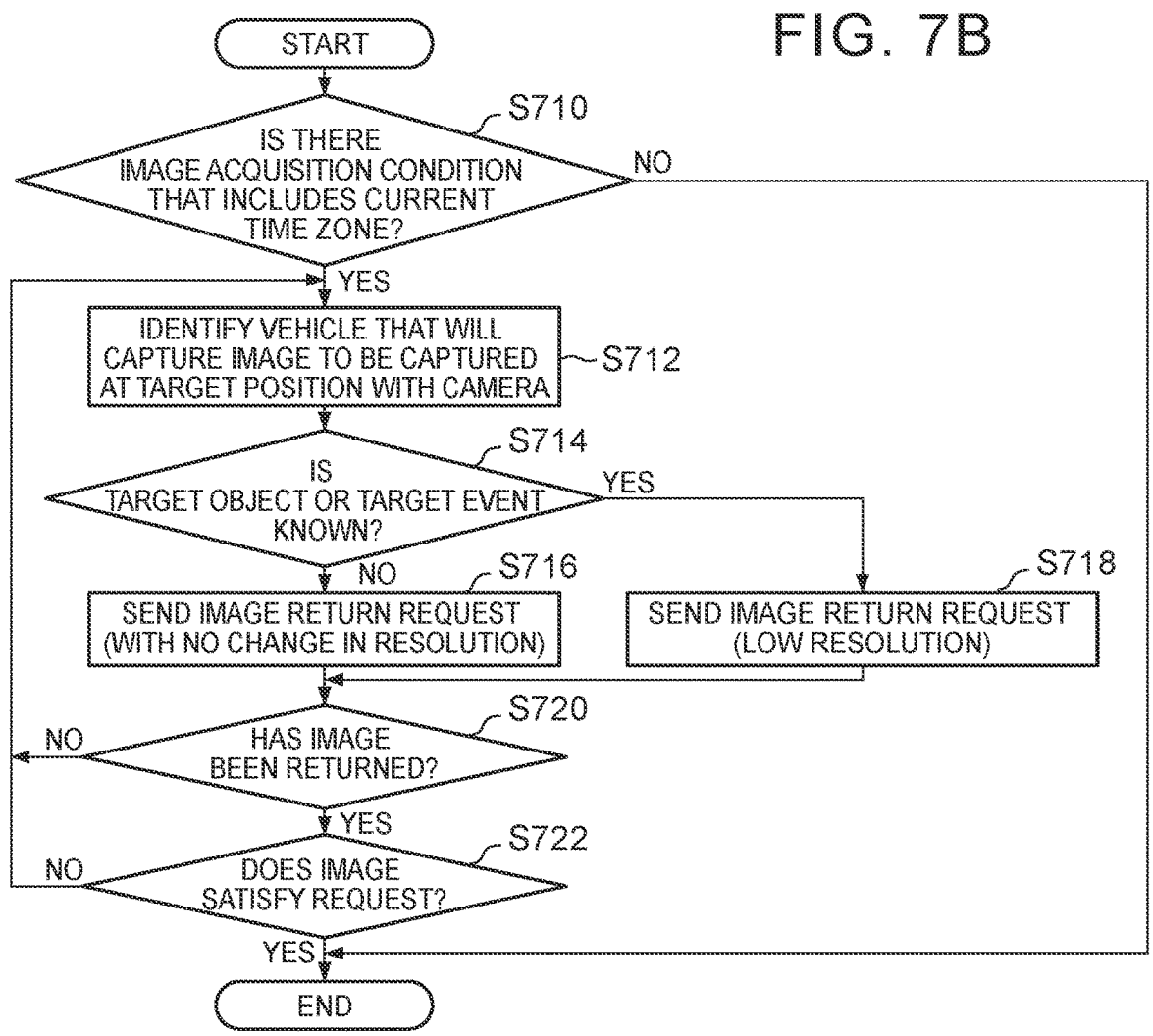
FIG. 7B is a flowchart schematically showing a third example of captured image acquisition processing by the center server.

Next, FIG. 7A and FIG. 7B are flowcharts schematically showing a third example of the captured image acquisition processing performed according to this embodiment. More specifically, FIG. 7A is an example of a flowchart related to the pre-processing of the captured image acquisition processing, and FIG. 7B is a flowchart related to the main processing of the captured image acquisition processing. The flowchart in FIG. 7A may be performed at a predetermined periodic interval (for example, at an interval of several days to several weeks). The flowchart in FIG. 7B may be repeatedly performed at a predetermined time interval (for example, at an interval of several tens of minutes to several hours) defined appropriately according to the classification of time zones.

Referring to FIG. 7A, the update need information acquisition unit 5204 acquires, in step S702, the image acquisition history information on a past predetermined period (e.g., several months) from the image acquisition history information DB 5200C.

In step S704, as a position where the need for updating the dynamic map is relatively high, the acquisition condition identification unit 5205 identifies a capturing position where the occurrence frequency in the image acquisition history information in the past predetermined period is relatively higher than that of the other positions in the target area, more specifically, a capturing position where the occurrence frequency is equal to or greater than the predetermined threshold value.

In step S706, as a time zone in which the dynamic map update need is relatively high for the position identified in step S704, the acquisition condition identification unit 5205 identifies a time zone of the day in which the occurrence frequency of the position in the image acquisition history information in the past predetermined period is relatively high, more specifically, a time zone of the day in which the occurrence frequency of the position is equal to or greater than the predetermined threshold value. The length of a time zone may be arbitrary, for example, several tens of minutes, one hour, or several hours.

In step S708, the acquisition condition identification unit 5205 updates the image acquisition condition DB 5200E with the identified position and time zone (image acquisition condition) and then terminates the current processing. That is, if the image acquisition condition DB 5200E includes a past image acquisition condition, the acquisition condition identification unit 5205 deletes the image acquisition condition and saves the newly identified image acquisition condition.

Referring to FIG. 7B, the processing device 52 determines in step S710 whether the image acquisition conditions stored in the image acquisition condition DB 5200E include an image acquisition condition corresponding to the time zone in which the current processing is performed. If the image acquisition conditions stored in the image acquisition condition DB 5200E include an image acquisition condition corresponding to the time zone in which the current processing is performed, the processing of the processing device 52 proceeds to step S712. Otherwise, the current processing is terminated. As a result, from among a plurality of vehicles 3, the vehicle identification unit 5207 can identify, in step S712, the vehicle 3 that will capture the position satisfying the acquisition condition in the time zone (timing) satisfying the acquisition condition.

The processing in steps S712 to S722 is the same as the processing in steps S516 to S526 in FIG. 5 and, therefore, the description will be omitted.

[Operation]

As described above, in this embodiment, the captured image accumulation processing unit 5202 acquires images, captured by the camera 34, from a plurality of vehicles 3 each having the camera 34 that captures the surroundings, and the map update unit 5210 updates the dynamic map of the target area based on the captured images. At this time, the map update unit 5210 varies the update frequency of the dynamic map depending on the position in the target area of the dynamic map.

As a result, since the update frequency varies depending on the position in the target area of the dynamic map, the center server 5 can request the vehicle 3 to send captured images according to the update frequency that is different depending on the position. Therefore, the center server 5 causes the vehicle 3 to return (upload) only the required captured images according to the update frequency, allowing the dynamic map to be updated while reducing the unnecessary communication costs.

In addition, in this embodiment, the update need information acquisition unit 5204 acquires the update need information on the update need of the users, who use the dynamic map, for an arbitrary position in the target area of the dynamic map. Then, based on the update need information acquired in this way, the map update unit 5210 updates the dynamic map in such a way that the higher the update need is, the higher the update frequency is in the target area of the dynamic map.

As a result, the center server 5 can acquire the update need information on the user's update need that may differ depending on the position in the target area of the dynamic map. Therefore, the center server 5 can actually update the dynamic map based on the update need information in such a way that the update frequency becomes higher as the update need is higher.

In addition, in this embodiment, the acquisition condition identification unit 5205 identifies the acquisition condition that includes a position where the captured image is to be captured by the camera 34, based on the update need information. In addition, the vehicle identification unit 5207 identifies, from a plurality of vehicles 3, the vehicle 3 that will capture the position satisfying the acquisition condition, based on the position information on the plurality of vehicles 3 acquired by the position information acquisition unit 5206. Furthermore, the image request unit 5209 sends a return request (image return request) for the captured image, captured by the camera 34 at the position satisfying the acquisition condition, to the vehicle 3 identified by the vehicle identification unit 5207. Then, the captured image accumulation processing unit 5202 acquires the captured image, returned in response to the return request, from the vehicle 3 identified by the vehicle identification unit 5207.

As a result, the center server 5 identifies the vehicle 3 that will capture the image based on the target position where the captured image, identified from the update need information, is to be acquired and on the position information on each of the vehicles 3 and, then, requests the identified vehicle 3 to return the captured image of the target position. That is, the center server 5 can actually cause the vehicle 3 to return (upload) the captured image according to the user's update need based on the update need information. Therefore, the center server 5 can actually update the dynamic map while reducing the unnecessary communication costs.

In addition, in this embodiment, the update need information acquisition unit 5204 acquires the update need information that includes the information on the SNS posting frequency at an arbitrary position in the target area of the dynamic map.

As a result, if the SNS posting frequency at a certain position is relatively high, the center server 5 can estimate that the user's interest in an object or an event at that position is high. That is, the center server 5 can actually determine the user's update need based on the SNS posting frequency according to the position in the target area of the dynamic map.

Furthermore, in this embodiment, the update need information acquisition unit 5204 acquires the update need information that includes the information on the SNS posting frequency within the latest predetermined time. Then, as the position where the captured image is to be acquired, the acquisition condition identification unit 5205 identifies a position where the posting frequency is relatively higher than that of the other positions in the target area of the dynamic map.

As a result, the center server 5 can actually determine a position where the SNS posting frequency within the latest predetermined time is relatively high as a position where the user's update need is relatively high and, thus, identify the position as a position where the captured image is to be captured.

Furthermore, the update need information acquisition unit 5204 may acquire the update need information that includes a request from the user for updating the dynamic map for an arbitrary position within the target area of the dynamic map.

As a result, when a request is received from the user for updating the dynamic map for a certain position, the center server 5 can directly determine that there is a need for updating the dynamic map for that position. Therefore, the center server 5 can actually determine the user's update need based on a request for updating the dynamic map for an arbitrary position in the target area.

Furthermore, in this embodiment, the update need information acquisition unit 5204 acquires the update need information that includes a request (image acquisition request), from the user, requesting the acquisition of a captured image for an arbitrary position within the target area of the dynamic map. Then, the acquisition condition identification unit 5205 identifies the position in the target area of the dynamic map corresponding to the request as the position where the captured image is to be acquired.

As a result, the center server 5 can actually determine the position, specified by the image acquisition request requesting the acquisition of a captured image, as a position where the user's update need is relatively high and, thus, can identify the position as a position where the captured image is to be acquired.

In addition, in this embodiment, the update need information acquisition unit 5204 may acquire the update need information that includes the history information (image acquisition history information) on the capturing positions of the captured images acquired in the past by the captured image accumulation processing unit 5202.

As a result, when a certain position frequently occurs as the capturing position of captured images acquired in the past, the center server 5 can estimate that the user's update need for the position tends to be relatively high. That is, the center server 5 can actually determine the user's update need based on the history information (image acquisition history information) on the capturing positions of the captured images acquired in the past.

In addition, in this embodiment, the acquisition condition identification unit 5205 identifies a capturing position which is included in the capturing positions of the captured images acquired in the past by the captured image accumulation processing unit 5202 and whose frequency of occurrence in the image acquisition history information is relatively higher than that of the other positions in the target area of the dynamic map, as the position where the captured image is to be acquired.

As a result, the center server 5 can actually determine a capturing position which is included in the capturing positions of the captured images acquired in the past and whose frequency of occurrence in the image acquisition history information is relatively high, as a position where the user's update need is relatively high and, thus, can identify the position as a position where the captured image is to be acquired.

Furthermore, in this embodiment, the image acquisition history information includes the capturing times of the captured images. In addition, as the timing at which the captured image satisfying the acquisition condition is to be acquired, the acquisition condition identification unit 5205 identifies a time zone as follows. That is, at the image capturing position corresponding to the position at which the identified captured image is to be acquired, the acquisition condition identification unit 5205 determines a time zone which is included in the time zones to which the capturing times of the captured images acquired in the past by the captured image accumulation processing unit 5202 belong and whose frequency of occurrence in the image acquisition history information is relatively higher than that of the other time zones of the day and, then, identifies the determined time zone as the timing at which the captured image satisfying the acquisition condition is to be acquired. In addition, from the plurality of vehicles 3, the vehicle identification unit 5207 identifies the vehicle 3 that will capture the position satisfying the acquisition condition at the timing satisfying the acquisition condition.

As a result, for the position where the captured image is to be acquired, the center server 5 further determines the time zone in which the update need is relatively high based on the history information that includes the capturing times of the captured images. Then, as the timing at which the captured image is to be acquired, the center server 5 can identify the determined time zone as the timing at which the captured image is to be acquired. Therefore, the center server 5 can cause the vehicle 3 to send the captured image according not only to the user's update need that depends on the position in the target area but also to the user's update need that depends on the time zone. That is, the center server 5 can reflect the update need, determined from the user's chronological viewpoint, on the acquisition timing of the captured image, further reducing the unnecessary communication costs.

Furthermore, in the present embodiment, the target determination unit 5208 determines whether an object or an event captured at the position satisfying the acquisition condition is known. Then, the image request unit 5209 sends an image return request to the vehicle 3, identified by the vehicle identification unit 5207, to return the captured image. This image return request requests the vehicle 3 to return the captured image that is determined by the target determination unit 5208 to be a known captured target and is captured by the camera 34 at the position satisfying the acquisition condition, with its resolution reduced to a relatively low resolution.

As a result, if the capturing target at the position where the captured image is to be acquired is known, the center server 5 can cause the vehicle 3 to send the captured image with a low resolution because there is no problem in determining the situation of the captured image even if its resolution is low. Therefore, the center server 5 can reduce the capacity of the captured image to be sent from the vehicle 3, further reducing the unnecessary communication costs.

Furthermore, the processing is sometimes performed in order to reduce the communication costs. For example, a captured image is compressed by a vehicle-mounted device (ECU 32) or the meta information (for example, information on an object, an event, and these conditions) is recognized from a captured image. However, in this case, the processing described above sometimes requires a larger capacity of memory for temporarily holding a certain amount of captured images or a performance upgrade of the vehicle-mounted device to implement the above processing and, as a result, there is a possibility that the cost of the vehicle-mounted device is increased.

On the other hand, the present embodiment does not require any additional processing for the vehicle-mounted device, making it possible to reduce the communication costs while preventing an increase in the cost of the vehicle 3 (vehicle-mounted device).

While the embodiments of the present disclosure have been described in detail, it is to be understood that the present disclosure is not limited to the specific embodiments above but that various modifications and changes may be added within the scope of the spirit described in claims and the specification.

What is claimed is:

1. A dynamic map update device comprising a processor configured to
   acquire a captured image from a plurality of vehicles, each of the plurality of vehicles having a camera configured to capture surroundings, the captured image being captured by the camera;
   update a dynamic map of a predetermined area based on the captured image;
   vary an update frequency of the dynamic map depending on a position among a plurality of positions in the predetermined area; and
   acquire the captured image from the plurality of vehicles according to the update frequency that varied depending on the position among the plurality of the positions in the predetermined area.

2. The dynamic map update device according to claim 1, wherein the processor is configured to
   acquire update need information on an update need of a user, the update need information being related to an arbitrary position of the plurality of positions, the user using the dynamic map, and
   update the dynamic map in such a way that, based on the update need information, the update frequency of the arbitrary position becomes higher as the update need for updating the arbitrary position is higher in the predetermined area.

3. The dynamic map update device according to claim 2, wherein the processor is configured to
   identify an acquisition condition based on the update need information, the acquisition condition including an acquisition position where the captured image is to be acquired by the camera,
   acquire position information on each of the plurality of vehicles,
   identify a capturing vehicle that will capture the acquisition position from among the plurality of vehicles, based on the position information,
   send a return request to the capturing vehicle, the return request requesting a return of the captured image captured by the camera at the acquisition position, and
   acquire the captured image from the capturing vehicle, the captured image being returned in response to the return request.

4. The dynamic map update device according to claim 3, wherein the processor is configured to acquire the update need information including information on a posting frequency to a social networking service at the arbitrary position.

5. The dynamic map update device according to claim 4, wherein the processer is configured to acquire the update need information including information on the posting frequency within a latest predetermined time, and identify a position where the posting frequency is relatively higher than at other positions in the predetermined area, as the acquisition position.

6. The dynamic map update device according to claim 3, wherein the processor is configured to acquire the update need information including a request from the user for updating the dynamic map for the arbitrary position.

7. The dynamic map update device according to claim 6, wherein the processor is configured to acquire the update need information including the request for requesting an acquisition of the captured image at the arbitrary position from the user, and identify the arbitrary position as the acquisition position.

8. The dynamic map update device according to claim 3, wherein the processor is configured to acquire the update need information including history information on a capturing position where the captured image is acquired in the past.

9. The dynamic map update device according to claim 8, wherein the history information includes a plurality of capturing positions where the captured image is acquired in the past, and the processor is configured to identify a frequent capturing position among the capturing positions, as an identified capturing position where the captured image is to be acquired, wherein occurrence frequency of the frequent capturing position, in the history information, is relatively higher than occurrence frequency of the other capturing positions in the predetermined area.

10. The dynamic map update device according to claim 9, wherein the history information includes a capturing time of the captured image, and the processor is configured to identify, at the identified capturing position, a frequent time zone among time zones, as a timing at which the captured image satisfying the acquisition condition is to be acquired, the time zones being time zones to which the capturing times of the captured images captured in the past belong, occurrence frequency of the frequent time zone, in the history information, being relatively higher than occurrence frequency of the other time zones of a day, and identify, from among the plurality of vehicles, a second capturing vehicle that will capture the acquisition position.

11. The dynamic map update device according to claim 3, wherein the processer is configured to determine whether an object or an event is known, the object or the event being a capturing target at the acquisition position, and send the return request to the capturing vehicle, the return request requesting the return of the captured image captured by the camera at the acquisition position with a resolution set lower when the capturing target is determined to be know than when the capturing target is determined to be not known.

12. The dynamic map update device according to claim 11, wherein the processer is configured to determine that the capturing target is known when the capturing target is registered in the dynamic map update device.

13. A dynamic map update method, wherein the dynamic map update method is executed by a device configured to communicate with a plurality of vehicles, each of the plurality of vehicles having a camera configured to capture surroundings, the dynamic map update method comprising:

(a) acquiring a captured image from the plurality of vehicles, the captured image being captured by the camera;

(b) updating a dynamic map of a predetermined area based on the captured image;

(c) varying an update frequency of the dynamic map depending on a position among a plurality of positions in the predetermined area; and (d) acquiring the captured image from the plurality of vehicles according to the update frequency that varied depending on the position among the plurality of the positions in the predetermined area.

14. The dynamic map update method according to claim 13, further comprising (e) acquiring update need information on an update need of a user, the update need information being related to an arbitrary position of the plurality of positions, the user using the dynamic map, wherein step (a) includes updating the dynamic map in such a way that, based on the update need information, the update frequency of the arbitrary position becomes higher as the update need for updating the arbitrary position is higher in the predetermined area.

15. The dynamic map update method according to claim 14, further comprising (f) identifying an acquisition condition based on the update need information, the acquisition condition including an acquisition position where the captured image is to be acquired by the camera, (g) acquiring position information on each of the plurality of vehicles, (h) identifying a capturing vehicle that will capture the acquisition position from among the plurality of vehicles, based on the position information, (i) sending a return request to the capturing vehicle, the return request requesting a return of the captured image captured by the camera at the acquisition position, and (j) acquiring the captured image from the capturing vehicle, the captured image being returned in response to the return request.

16. The dynamic map update method according to claim 15, wherein step (e) includes (k) acquiring the update need information including information on a posting frequency to a social networking service at the arbitrary position.

17. The dynamic map update method according to claim 16, wherein step (k) includes acquiring the update need information including information on the posting frequency within a latest predetermined time, and step (f) includes identifying a position where the posting frequency is relatively higher than at other positions in the predetermined area, as the acquisition position.

18. The dynamic map update method according to claim 15, wherein step (e) includes (l) acquiring the update need information including a request from the user for updating the dynamic map for the arbitrary position.

19. The dynamic map update method according to claim 18, wherein step (l) includes acquiring the update need information including the request for requesting an acquisition of the captured image at the arbitrary position from the user, and step (f) includes identifying the arbitrary position as the acquisition position.

20. A non-transitory computer readable medium recording a dynamic map update program, the program causing a computer to execute:

acquiring a captured image from a plurality of vehicles, each of the plurality of vehicles having a camera configured to capture surroundings, the captured image being captured by the camera;

updating a dynamic map of a predetermined area based on the captured image;

varying an update frequency of the dynamic map depending on a position among plurality of positions in the predetermined area; and acquiring the captured image from the plurality of vehicles according to the update frequency that varied depending on the position among the plurality of the positions in the predetermined area.

* * * * *